(12) United States Patent
Barnett et al.

(10) Patent No.: US 11,643,189 B2
(45) Date of Patent: May 9, 2023

(54) WINGTIP DEVICE ATTACHMENT

(71) Applicant: Airbus Operations Limited, Bristol (GB)

(72) Inventors: Thomas Barnett, Bristol (GB); Andrew Scaife, Bristol (GB); Lee Proudler, Bristol (GB)

(73) Assignee: Airbus Operations Limited, Bristol (GB)

( * ) Notice: Subject to any disclaimer, the term of this patent is extended or adjusted under 35 U.S.C. 154(b) by 303 days.

(21) Appl. No.: 16/851,490

(22) Filed: Apr. 17, 2020

(65) Prior Publication Data
US 2020/0331593 A1    Oct. 22, 2020

(30) Foreign Application Priority Data

Apr. 18, 2019 (GB) .................................. 1905580

(51) Int. Cl.
*B64C 23/06* (2006.01)
*B64C 3/18* (2006.01)
(52) U.S. Cl.
CPC ............ *B64C 23/069* (2017.05); *B64C 3/185* (2013.01)
(58) Field of Classification Search
CPC ............ B64C 23/069; B64C 5/08; B64C 3/56
See application file for complete search history.

(56) References Cited

U.S. PATENT DOCUMENTS

| | | | |
|---|---|---|---|
| 2007/0018049 A1* | 1/2007 | Stuhr .................... | B64C 23/069 244/124 |
| 2009/0302159 A1* | 12/2009 | Pajard ...................... | B64C 1/26 244/124 |
| 2012/0112005 A1 | 5/2012 | Chaussee et al. | |

FOREIGN PATENT DOCUMENTS

WO    WO 2015/162399 A1    10/2015

OTHER PUBLICATIONS

British Search Report for Application No. 1905580.5 dated Oct. 14, 2019.

* cited by examiner

*Primary Examiner* — Timothy D Collins
*Assistant Examiner* — Eric Acosta
(74) *Attorney, Agent, or Firm* — KDW Firm PLLC (57) ABSTRACT

A wingtip device to attach to a wing of an aircraft includes an aerofoil portion and a connection spar arranged to be received in a connection spar receiving portion of the wing of an aircraft. The spar includes a first through hole in a first portion of the connection spar and a second through hole in a second rearward portion of the connection spar, the second portion being rearward of the first portion with respect to a direction of flight. The first and second through holes are arranged to receive a retaining pin that is to be inserted through both the first and second through holes.

21 Claims, 7 Drawing Sheets

WINGTIP DEVICE ATTACHMENT

CROSS-REFERENCE TO RELATED APPLICATION

This application claims priority to GB 1905580.5, filed Apr. 18, 2019, the entire disclosure of which is incorporated by reference herein.

TECHNICAL FIELD

The disclosure herein relates to methods of and mechanisms for attaching wingtip devices to a wing of an aircraft

BACKGROUND

Modern aircraft wings are often equipped with wingtip devices designed to produce aerodynamic effects at the wingtip, to provide a desired effect on the aerodynamic characteristics of the aircraft. Such wingtip devices are extensions of a main wing body that may extend in a vertical or near-vertical direction with respect to the aircraft in level flight. Wingtip devices may include, for example, winglets, wing end-plates, so-called Hoerner wing tips, wingtip fences, canted winglets, blended winglets, raked wingtips, split-tips, split scimitar wingtips, advanced technology winglets, spiroid winglets, and any other wingtip device that may be attached to the end of the wing.

For example, modern airliners are often equipped with winglets that have a vertical or near-vertical extent, that may provide one or more improved aerodynamic characteristics. Such winglets may be designed to reduce wake vortices produced by the wingtip as higher-pressure air from beneath the wing tries to move towards the relative lower-pressure air above the wing and/or to utilise energy from wingtip vortices to produce an additional apparent thrust by directing airflow from the vortices in a rearward direction. Accordingly, winglets may be beneficial for controlling air traffic as other aircraft can be positioned more closely behind heavy aircraft, which are typically separated to reduce the risks associated with turbulence produced by an aircraft ahead, particularly at or near airports (where the lift generated by aircraft wings and therefore the turbulence produced by the wings is greatest) and/or can improve the fuel consumption efficiency of aircraft, which in turn may provide environmental and cost benefits.

Wingtip devices can be vulnerable to damage during normal operation of an aircraft, due to events such as bird-strikes and (due to being at the extreme ends of the wings) collisions with other aircraft and buildings. Accordingly, it is sometimes necessary to replace wingtip devices in the field. Servicing time for such replacements can be several hours, during which time the aircraft is out of service, representing a cost to aircraft operators and causing delays to passengers and/or cargo.

The disclosure herein mitigates the above-mentioned problems and accordingly may reduce servicing time and/or servicing costs by simplifying the mechanism for retaining a wingtip device and the method of installing such a wingtip device.

SUMMARY

A first aspect of the disclosure herein provides a wingtip device arranged to attach to a wing of an aircraft, the wingtip device comprising an aerofoil portion and a connection spar arranged to be received in a connection spar receiving portion of the wing of an aircraft, the connection spar comprising: a first through hole in a first portion of the connection spar; and a second through hole at a second portion of the connection spar, the second portion being rearward of the first portion with respect to a direction of flight of the aircraft, wherein the first and second through holes are arranged to receive a first retaining pin that is to be inserted through both the first and second through holes.

Optionally, the first and second through holes are located at an outboard end of the spar.

Optionally, the connection spar comprises a recess at an inboard end of the connection spar, the recess being arranged to receive a pin fixed to the connection spar receiving portion.

Optionally, the connection spar comprises one or more protrusions arranged to be received in a corresponding receiver located in the connection spar receiving portion.

Optionally, the one or more protrusions are located at an inboard end of the connection spar.

Optionally, the first and second through holes are located at an inboard end of the connection spar.

Optionally, the wingtip device comprises one or more protrusions located at an outboard end of the connection spar, the one or more protrusions being arranged to be received by one or more corresponding receivers in the connection spar receiving portion.

Optionally, the first and second through holes are arranged to receive the pin substantially in the direction of flight.

Optionally, the wingtip device comprises a first flange located forward of the connection spar, the first flange comprising a third through hole arranged to receive the first retaining pin.

Optionally, the first flange and the first and second through holes of the connection spar are arranged to receive the pin substantially in the direction of flight.

Optionally, the connection spar and the first flange are arranged to receive the first retaining pin from a leading-edge portion of the wing of the aircraft and towards a trailing-edge portion of the wing of the aircraft.

Optionally, the wingtip device comprises a second flange located rearward of the connection spar, the second flange comprising a fourth through hole arranged to receive a second retaining pin.

Optionally, the orientation of the fourth through hole is substantially perpendicular to the orientation of the first, second and third through holes.

Optionally, the fourth through hole is orientated to receive the second pin in a direction substantially perpendicular to the direction of flight.

Optionally, the wingtip device is one of: a winglet; a wing end-plate; a Hoerner wing tip; a wingtip fence; a canted winglet; a blended winglet; a raked wingtip; a split-tip; a split scimitar wingtip; an advanced technology winglet; and a spiroid winglet.

A second aspect of the disclosure herein provides a wingtip retaining system comprising: a wing for an aircraft, the wing comprising a wing box located at an outboard end of the wing, the wing box comprising a first through hole in a first portion of the wing box and a second through hole in a second portion of the wing box, the second portion being rearward of the first portion with respect to a direction of flight; a wingtip device according to the first aspect; and a retaining pin inserted through the forward and rearward through holes of the wing box and the forward and rearward through holes of the wing box, thereby retaining the wingtip device.

Optionally, the connection spar receiving portion comprises a fixed pin arranged to engage a corresponding recess located at an inboard end of the connection spar.

Optionally, the connection spar receiving portion comprises one or more receivers arranged to receive corresponding protrusions from the connection spar.

A third aspect of the disclosure herein provides a vehicle comprising a wingtip device of the first aspect or a wingtip device retaining system of the second aspect.

Optionally, the vehicle is an aircraft.

A fourth aspect of the disclosure herein provides a method of retaining a wingtip device of the first aspect to a wing of an aircraft, the wing comprising a connection spar receiving portion comprising a first through hole and a second through hole located rearward of the first through hole in a direction of flight, the method comprising: inserting a connection spar of the wingtip device into a connection spar receiving portion of the wing; and inserting a retaining pin through the forward and rearward through holes and through corresponding through holes in the connection spar, thereby retaining the connection spar in the connection spar receiving portion.

BRIEF DESCRIPTION OF THE DRAWINGS

Embodiments of the disclosure herein will now be described, by way of example only, with reference to the accompanying drawings, in which.

DETAILED DESCRIPTION

Figure 1:
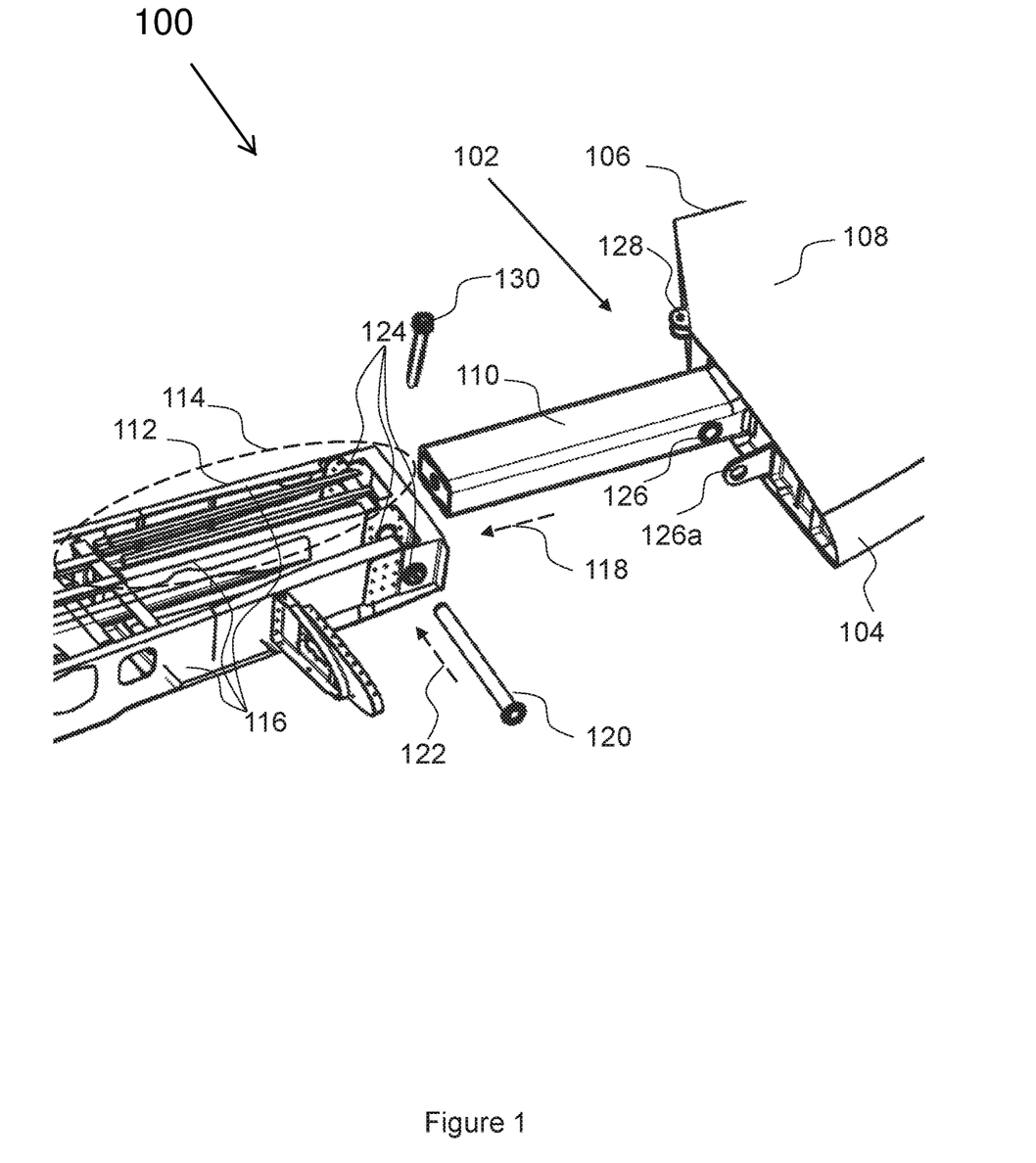
FIG. 1 is a schematic diagram showing an exploded perspective view of a wingtip device retaining system according to an embodiment.

FIG. 1 illustrates a wingtip device retaining system 100 in which a wingtip device 102 is arranged to attach to a wing of an aircraft. The wingtip device 102 comprises a leading edge portion 104 arranged to align (at least approximately) with a leading edge (not shown for clarity) of the wing of an aircraft when installed on an aircraft and a trailing edge portion 106, arranged to align (at least approximately) with a trailing edge (also not shown for clarity) of the wing of an aircraft when installed on an aircraft.

The wingtip device 102 comprises an aerofoil portion 108 that is exposed to airflow during flight and a connection portion (referred to hereinafter as a connection spar 110), which is arranged to be received in a connection spar receiving portion 112 of the wing of an aircraft.

The connection spar receiving portion 112 may, for example, comprise a wing box 114 comprising two or more wing box spars 116 located at or towards the end of a wing of an aircraft, as shown in FIG. 1, with the outer-most skin of the wing of the aircraft not shown for clarity.

To install the wingtip device 102, the connection spar 110 is inserted into the connection spar receiving portion 112 in the direction indicated by the dashed arrow labelled 118. A retaining pin 120 is then inserted in the direction of the dashed arrow labelled 122 through apertures 124 in the one or more wing box spars 116 and corresponding apertures 126, in the wingtip device 102. The direction indicated by the arrow 122 is from the leading edge of the wing towards the trailing edge of the wing. In the example shown in FIG. 1, the pin passes through apertures in three wing spar sections—a fore spar, a middle spar, and an aft spar—to retain the wingtip device 102. In the example shown in FIG. 1, the pin 120 is inserted through apertures 124, 126 located in an outboard end of the connection spar 110 and the connection spar receiving portion 112.

In particular, the retaining pin 120 may be installed from a position towards the leading edge of the wing. This may require only removal of the skin panels at the leading edge of the wing which, with respect to prior art mechanisms that involve more than one pin, may simplify removal and/or replacement of the wingtip device 102—by focussing work on only one edge of the wig and/or avoiding the need to work on the trailing edge of the wing (which is complicated by flight controls such as ailerons and flaps). This may provide a significant reduction in the time taken to remove and replace a damaged wingtip device 102 (by up to 50%), representing a significant labor and cost saving.

Also, in the example shown in FIG. 1, the wingtip device 102 comprises a first flange forward of the connecting spar 110 that comprises an aperture 126a through which the pin 120 is also received. The interfaces between the pin 120, the aperture 126a in the flange and the apertures 126 of the connection spar 110, provide a resistance to a moment acting upwardly (i.e. with respect to the horizontal plane of the aircraft in straight and level flight) and rearwardly (i.e. towards the tail end of the aircraft), due to lift and drag generated by the wingtip device 102 as described below with reference to FIGS. 5a and 5b.

The pin 120 provides, among other effects, resistance against the wingtip device 102 being pulled away from the end of the wing (i.e. resists forces pulling the wingtip device 102 away from a wing in a direction opposite to the direction indicated by the arrow labelled 118. Such forces may be experienced during flight as a result of the aerodynamic forces acting on the aerofoil portion 108 of the wingtip device 102.

In the example shown in FIG. 1, the apertures 126 in the wingtip device includes apertures 126 in the connection spar 110. The apertures receive the pin 120 and, in combination with the apertures 124 in the wing box spars 116, enable the pin 120 to lock the connection spar 110 of the wingtip device 102 to the connection spar receiving portion 112 to resist forces acting to remove the wingtip portion 102 from the wing. In particular, the pin resists forces acting outwardly to pull the wingtip device 102 out of the connection spar receiving portion 112.

In some examples, as shown in FIG. 1, the wingtip device 102 comprises a first flange comprising a further aperture 126a separated from, and ahead of, the connection spar 110 in the direction of flight. The further aperture 126a provides a point of contact between the pin 120 and the wingtip device 102 to resist torsional forces acting on the wingtip device 102 during flight about the axis of the wing (as a result of the aerodynamic properties of the wingtip device 102). That is, forces that urge the wingtip device 102 to twist or rotate about an axis substantially corresponding to the longitudinal axis of the connection spar 110.

As shown in the example of FIG. 1, the wingtip device 102 may comprise a second flange 128 separated from, and behind, the connection spar 110 in the direction of flight. The second flange 128 comprises an aperture arranged to receive a second pin, which will hereinafter be referred to as a drag pin 130. The drag pin 130 is inserted in a direction perpendicular to the direction 122 of the pin 120 i.e. the drag pin 130 is inserted vertically from the upper surface of the wing to the lower surface of the wing. Accordingly, the drag pin 130 resists forces that produce a moment urging the wingtip device 102 rearward and inward (i.e. towards the fuselage) during flight as described below with reference to FIG. 5b.

Although only described with reference to FIG. 1, the drag pin 130 and the corresponding flange 128 may be incorporated into any of the embodiments described below with reference to FIGS. 2 to 4.

Figure 2:
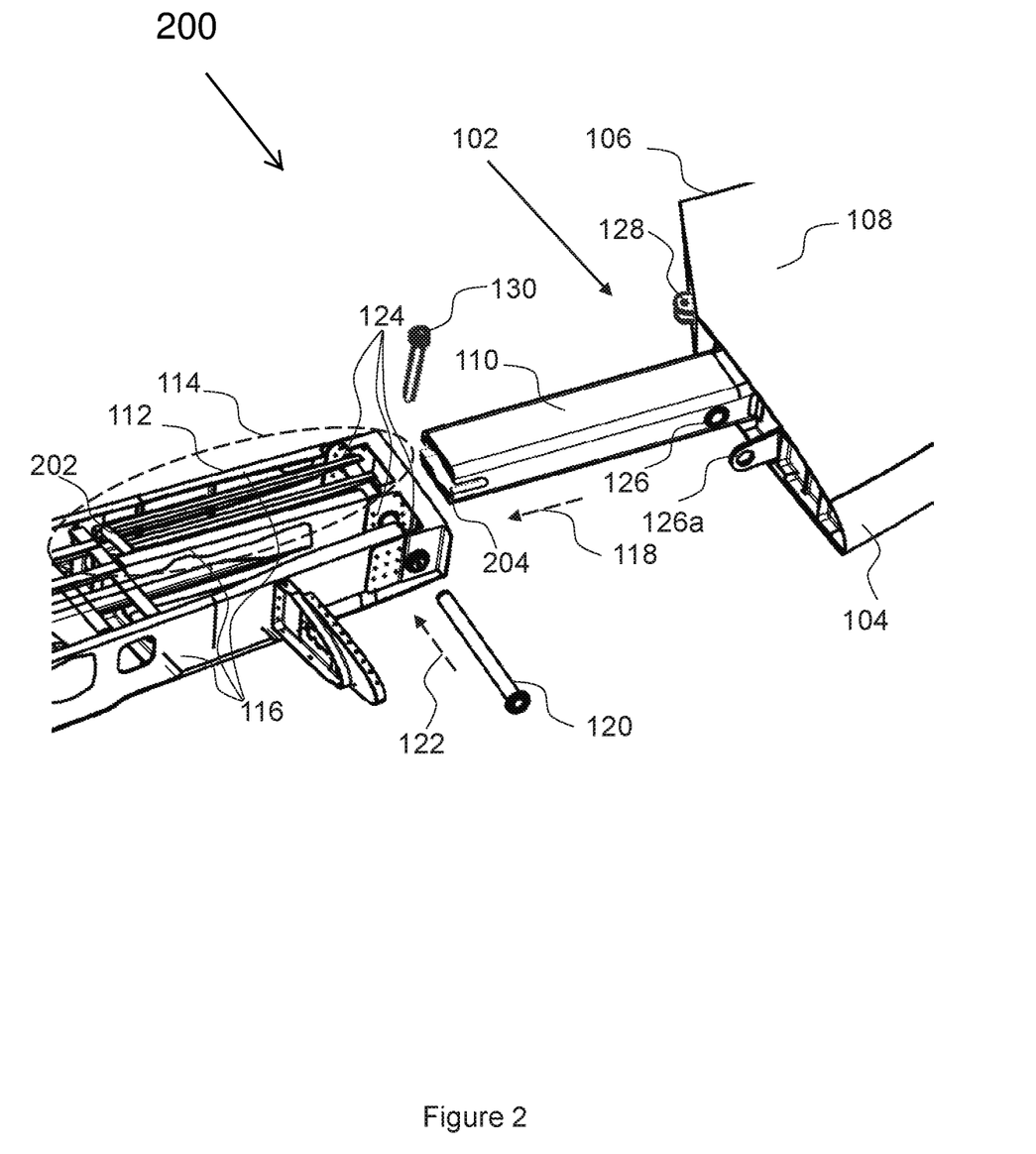
FIG. 2 is a schematic diagram showing an exploded perspective view of a wingtip device retaining system according to an embodiment.

As shown in FIG. 2, in some examples, the connection spar receiving portion 112 comprises a fixed pin 202 and the connection spar comprises a pin receiver 204, which may be in the form of a slot arranged to receive the fixed pin 202. In common with the example shown in FIG. 1, in the example shown in FIG. 2, the pin 120 is inserted through apertures 124, 126 located at an outboard end of the connection spar 110 and the connection spar receiving portion 112. The fixed pin 202 is located at an inboard end of the connection spar receiving portion 112 and the pin receiver 204 is located at an inboard end of the connection spar 110.

Figure 5A:
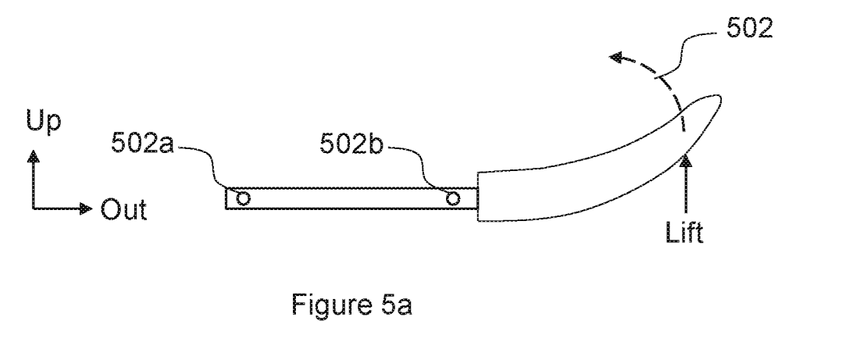
FIG. 5a is a schematic diagram showing the forces and moments acting on a wingtip device.

When the connection spar 110 of the wingtip device 102 is inserted into the connection spar receiving portion 112, the interface between the fixed pin 202 and the pin receiver 204 of the connection spar 110 provides a resistance to a moment acting upwardly (i.e. with respect to the horizontal plane of the aircraft in straight and level flight) and inwardly (i.e. towards the fuselage of the aircraft from the wingtip), due to lift generated by the wingtip device 102 as described below with reference to FIG. 5a.

Figure 3A:
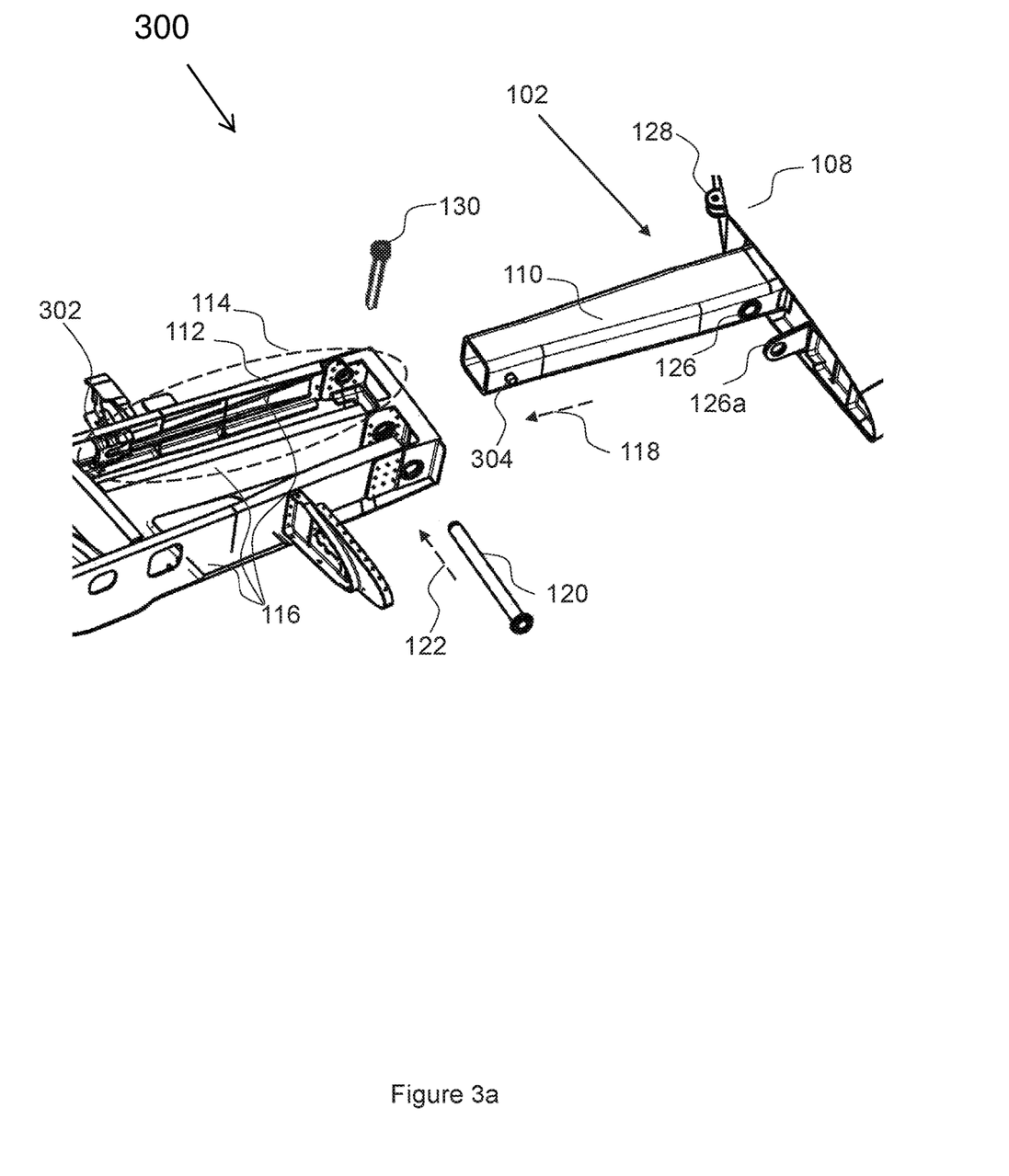
FIG. 3a is a schematic diagram showing an exploded perspective view of a wingtip device retaining system according to an embodiment.
Figure 3B:
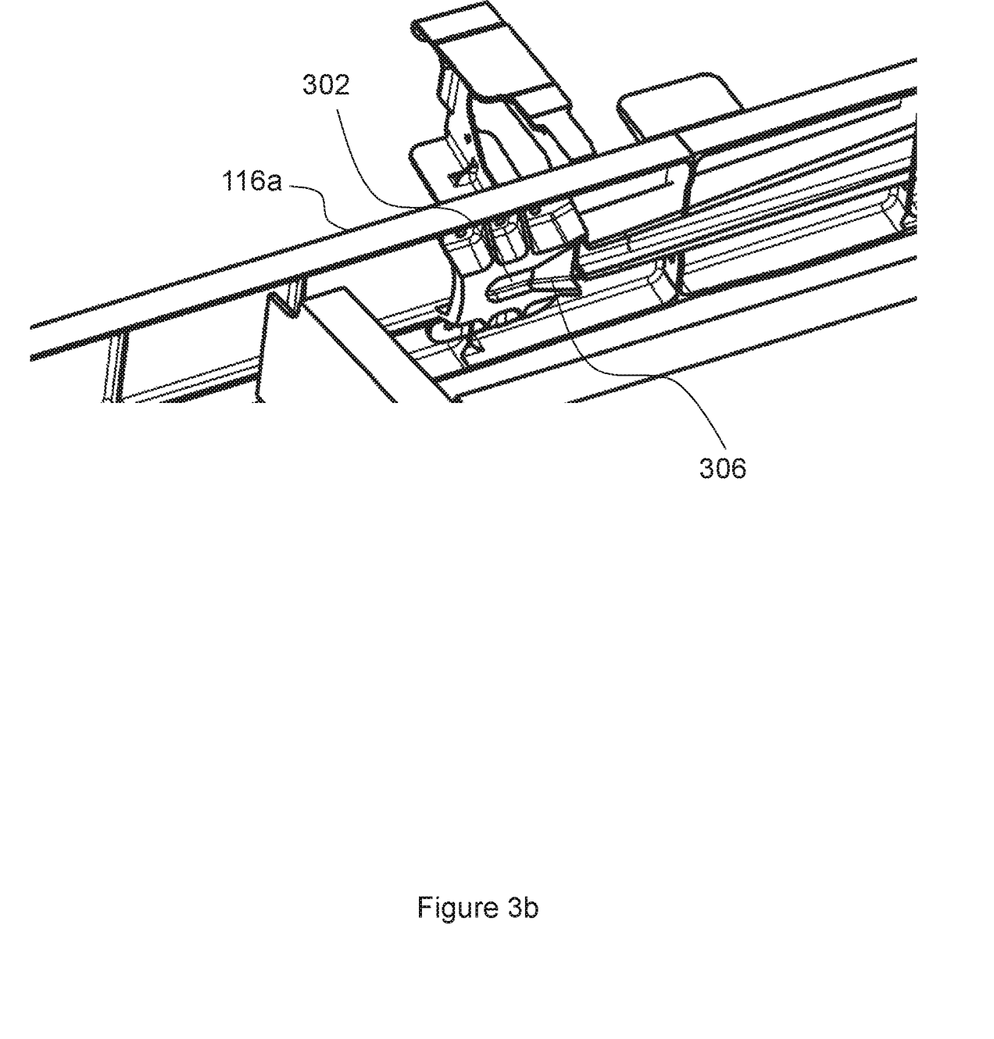
FIG. 3b is a schematic diagram showing an enlarged perspective view of a wingtip device retaining system according to an embodiment.

FIGS. 3a and 3b show an alternative arrangement to the example shown in FIG. 2 in which the fixed pin 202 in the connection spar receiving portion 112 is replaced with a receiver 302 and the pin receiver 204 in the connection spar 110 is replaced with one or more protrusions 304, protruding from fore and/or aft portions of the connection spar 102. The one or more protrusions 304 are received in the receiver 302 when the connection spar 110 of the wingtip device 102 is inserted into the connection spar receiving portion 112.

In common with the example shown in FIG. 1 and the example shown in FIG. 2, in the example shown in FIGS. 3a and 3b, the pin 120 is inserted through apertures 124, 126 located at an outboard end of the connection spar 110 and the connection spar receiving portion 112.

FIG. 3b shows a portion of the receiver 302 attached the aft wing spar 116a, in greater detail. As shown in FIG. 3b, the receiver 302 may comprise a tapered portion 306 arranged to guide the lugs 304 into the receiver 302. Similarly, the pin receiver 204 described above with reference to FIG. 2 may comprise a tapered portion.

Figure 4:
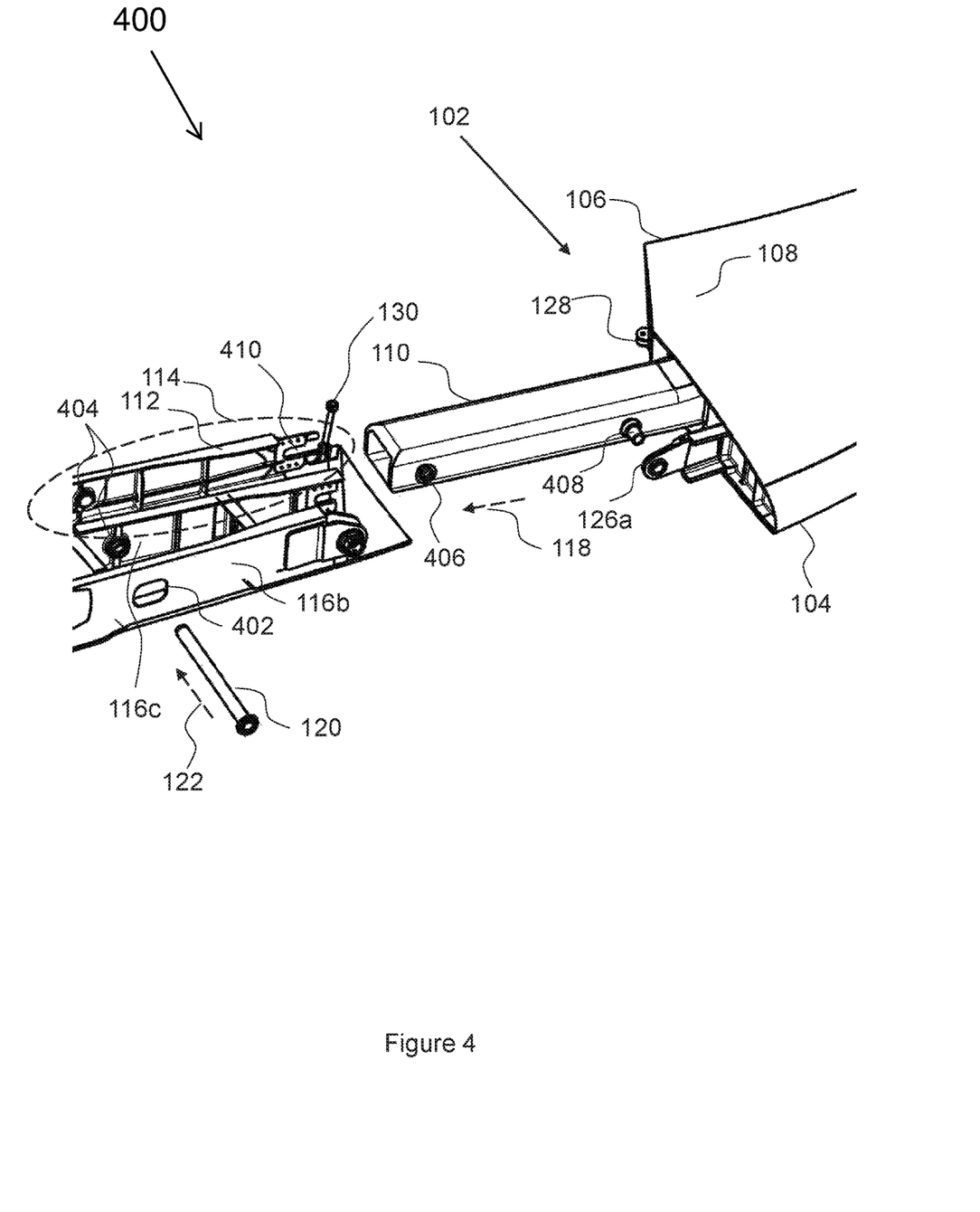
FIG. 4 is a schematic diagram showing an exploded perspective view of a wingtip device retaining system according to an embodiment.

FIG. 4 shows another alternative arrangement to that shown in FIGS. 3a and 3b, in which in contrast to the examples shown in FIGS. 1, 2, 3a and 3b, the pin 120 is inserted through apertures 404, 406 located in an inboard end of the connection spar 110 and the connection spar receiving portion 112.

In the example shown in FIG. 4, the pin is inserted via an access aperture 402 in a forward wing box spar 116b to be inserted through apertures 404 in the aft wing box spar and a middle wing box spar 116c.

The outboard end of the connection spar 110 comprises one or more protrusions 408 and the outboard end of the connection spar receiving portion 112 comprises one or more corresponding receivers 410 arranged to receive the one or more protrusions 408.

Figure 5B:
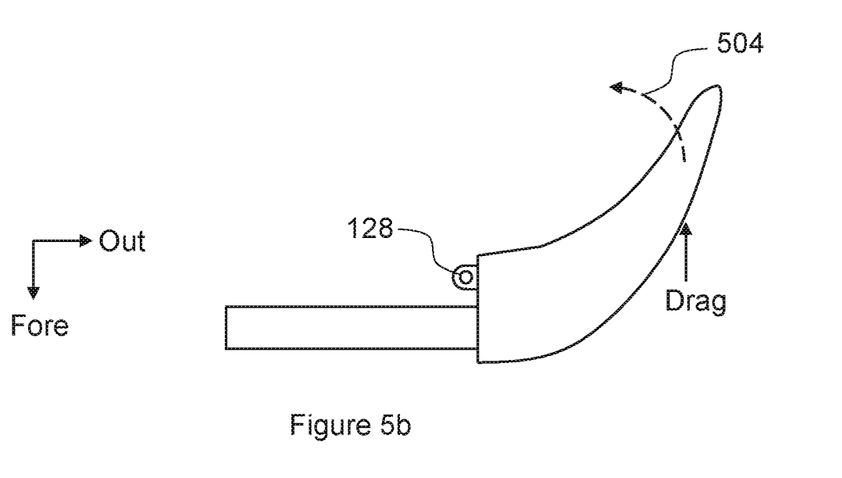
FIG. 5b is a schematic diagram showing the forces and moments acting on a wingtip device.
Figure 5C:
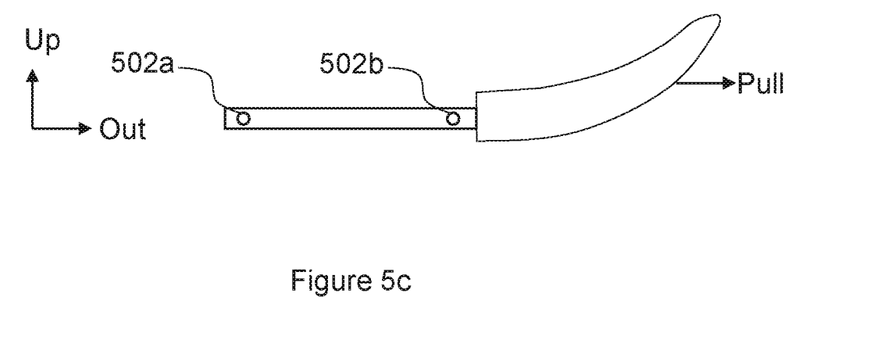
FIG. 5c is a schematic diagram showing the forces and moments acting on a wingtip device.

FIGS. 5a through 5c show the forces and moments that may act on the wingtip device 102 during various phases of flight.

FIGS. 5a and 5c show a schematic image corresponding with a view towards either the leading edge or trailing edge of a wingtip device. That is a view along the axis of the fuselage of an aircraft.

As shown in FIG. 5a, in some examples, the wingtip device 102 may generate lift that, due to the non-horizontal orientation of the wingtip device 102 comprises vertical and horizontal force components. That is the lift generated by the wingtip device acts both upwardly and inwardly (i.e. towards the fuselage). This results in a first moment 502 which acts to twist the connection spar 110 in a vertical direction within the connection spar receiving portion 112. In the embodiments described above with reference to FIGS. 1 through 4, the first moment 502 is resisted by there being two connection points 502a and 502b between the connection spar 110 and the connection spar receiving portion 112. In the example of FIG. 1, the two connection points 502a and 502b comprise the interfaces between the pin 120, the forward and rearward though holes 124 in the wing box 114 and the corresponding through holes 126 in the connection spar 110, and an interface between a surface of the connection spar 110 and a corresponding surface of the connection spar receiving portion 112. In the example of FIGS. 2, 3a and 3b, and 4, the two connection points 502a and 502b comprise the pin 120 and its corresponding receiving apertures (124, 126) and either the fixed pin (202) and the corresponding receiver (204) or the protrusions (304, 408) and their corresponding receiver (302, 410).

FIG. 5b shows a schematic image corresponding with a plan view of an aircraft, which may be a view from either above or below the aircraft. In the embodiments described above with reference to FIG. 1 through 4, the second moment 504 is resisted by the drag pin 130 being in place in the aperture of the second flange 128.

As shown in FIG. 5b, the wingtip device 102 generates drag as it moves through air during flight. This generates a second moment 504 acting rearwards, (i.e. towards the tail of the aircraft and inwardly (i.e. towards the fuselage). The second moment 504 acts to twist the connection spar 110 in a horizontal direction (towards the tail of the aircraft) within the connection spar receiving portion 112.

As shown in FIG. 5c, the mechanisms described above with reference to FIGS. 1 through 4 each provide a resistance to forces (however induced) that act to pull the wingtip device 102 away from the wingtip and, in particular, to resist removal of the connection spar 110 from the connection spar receiving portion 112 (and thus the wingtip device 102 from the wing). In particular, each of the connection points 502a and 502b acts to resist extraction of the connection spar 110 of the wingtip device 102 from the connection spar receiving portion112.

Figure 6:
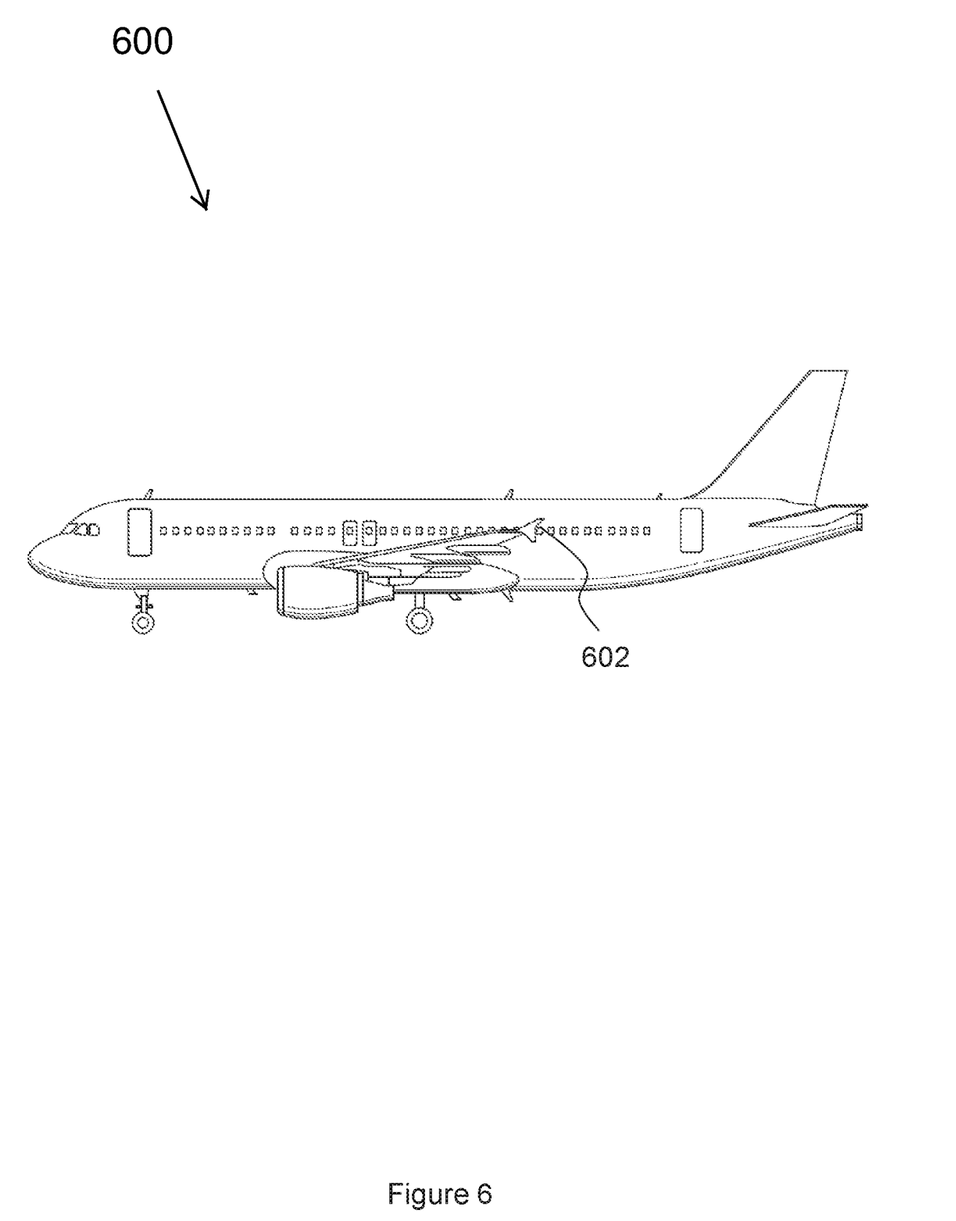
FIG. 6 is a schematic diagram showing a side view of an example of an aircraft of an embodiment.

In some embodiments, the wingtip device 100 described above with reference to FIG. 1 may be installed in a vehicle. Referring to FIG. 6, there is shown a schematic front view of an example of a vehicle according to an embodiment of the disclosure herein. In the example of FIG. 6, the vehicle is an aircraft 600. The aircraft 600 may comprise one or more wingtip devices 602, such as the wingtip device 102 described above with reference to FIGS. 1, 2, 3a, 3b, and 4. In other embodiments, the vehicle may be other than an aircraft; for example, it may be a spacecraft.

The above embodiments are to be understood as illustrative examples of the disclosure herein. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure herein, which is defined in the accompanying claims.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wingtip device for attachment to a wing of an aircraft, the wingtip device comprising:
   an aerofoil portion; and
   a connection spar arranged to be received, in an insertion direction, within a connection spar receiving portion of the wing of the aircraft, the connection spar comprising:
      a first aperture in a first portion of the connection spar; and
      a second aperture in a second portion of the connection spar, the second portion being rearward of the first portion with respect to a direction of flight of the aircraft, the direction of flight being inclined at an angle greater than 0° with respect to the insertion direction;
      wherein the first and second apertures are arranged to receive a retaining pin configured for insertion through both the first and second apertures;
      wherein, in a plane that is in the direction of flight, the connection spar has a cross-sectional profile that is substantially rectangular; and
      wherein the connection spar extends away from the aerofoil portion in the insertion direction.

2. The wingtip device according to claim 1, wherein the first and second apertures are located at an outboard end of the connection spar.

3. The wingtip device according to claim 1, wherein the connection spar comprises a fixed pin receiver at an inboard end of the connection spar, the fixed pin receiver being arranged to receive a fixed pin, which is fixed to the connection spar receiving portion.

4. The wingtip device according to claim 1, wherein the connection spar comprises one or more protrusions arranged to be received in a corresponding receiver located in the connection spar receiving portion.

5. The wingtip device according to claim 4, wherein the one or more protrusions are located at an inboard end of the connection spar.

6. The wingtip device according to claim 1, wherein the first and second apertures are located at an inboard end of the connection spar.

7. The wingtip device according to claim 6, comprising one or more protrusions located at an outboard end of the connection spar, the one or more protrusions being arranged to be received by one or more corresponding receivers in the connection spar receiving portion.

8. The wingtip device according to claim 1, wherein the first and second apertures are arranged to receive the retaining pin in the direction of flight.

9. The wingtip device according to claim 1, comprising a first flange located forward of the connection spar, with respect to a direction of flight of the aircraft, the first flange comprising a third aperture arranged to receive the retaining pin.

10. The wingtip device according to claim 9, wherein the first flange and the first and second apertures of the connection spar are arranged to receive the retaining pin in the direction of flight.

11. The wingtip device according to claim 9, wherein the connection spar and the first flange are arranged to receive the retaining pin from a leading-edge portion of the wing of the aircraft and towards a trailing-edge portion of the wing of the aircraft.

12. The wingtip device according to claim 9, comprising a second flange located rearward of the connection spar, with respect to a direction of flight of the aircraft, the second flange comprising a fourth aperture arranged to receive a drag pin to resist forces that produce a moment on the wingtip device rearward and inward, towards a fuselage of the aircraft to which the wingtip device is configured for attachment.

13. The wingtip device according to claim 12, wherein an orientation of the fourth aperture is perpendicular to an orientation of the first, second, and third apertures.

14. The wingtip device according to claim 12, wherein the fourth aperture is oriented to receive the drag pin in a direction perpendicular to the direction of flight.

15. The wingtip device according to claim 1, wherein the wingtip device is selected from the group consisting of a winglet, a wing end-plate, a Hoerner wing tip, a wingtip fence, a canted winglet, a blended winglet, a raked wingtip, a split-tip, a split scimitar wingtip, an advanced technology winglet, and a spiroid winglet.

16. A wingtip device retaining system comprising:
   a wing for an aircraft, the wing comprising a wing box located at an outboard end of the wing, the wing box comprising:
      a first aperture in a first portion of the wing box;
      a second aperture in a second portion of the wing box, the second portion of the wing box being rearward of the first portion of the wing box, with respect to a direction of flight of the aircraft; and
      a connection spar receiving portion;

a wingtip device for attachment to the wing of the aircraft, the wingtip device comprising:
- an aerofoil portion; and
- a connection spar arranged to be received, in an insertion direction, within the connection spar receiving portion, the connection spar comprising:
  - a first aperture in a first portion of the connection spar; and
  - a second aperture in a second portion of the connection spar, the second portion of the connection spar being rearward of the first portion of the connection spar, with respect to a direction of flight of the aircraft, the direction of flight being inclined at an angle greater than 0° with respect to the insertion direction;
  - wherein, in a plane that is in the direction of flight, the connection spar has a cross-sectional profile that is substantially rectangular; and
  - wherein the connection spar extends away from the aerofoil portion in the insertion direction; and
- a retaining pin, which is configured for insertion through each of the first and second apertures of the wingtip device and the first and second apertures of the wing box to retain the wingtip device on the wing.

17. The wingtip device retaining system according to claim 16, wherein the connection spar receiving portion comprises a fixed pin arranged to engage a corresponding fixed pin receiver located at an inboard end of the connection spar.

18. The wingtip device retaining system according to claim 16, wherein the connection spar receiving portion comprises one or more receivers arranged to receive corresponding protrusions from the connection spar.

19. A vehicle comprising a wingtip device according to claim 1.

20. The vehicle according to claim 19, wherein the vehicle is an aircraft.

21. A method of retaining a wingtip device to a wing of an aircraft, the method comprising:
- providing the wingtip device, which comprises:
  - an aerofoil portion; and
  - a connection spar arranged to be received, in an insertion direction, within a connection spar receiving portion of the wing of the aircraft, the connection spar comprising:
    - a first aperture in a first portion of the connection spar; and
    - a second aperture in a second portion of the connection spar, the second portion of the connection spar being rearward of the first portion of the connection spar with respect to a direction of flight of the aircraft, the direction of flight being inclined at an angle greater than 0° with respect to the insertion direction;
    - wherein, in a plane that is in the direction of flight, the connection spar has a cross-sectional profile that is substantially rectangular; and
    - wherein the connection spar extends away from the aerofoil portion in the insertion direction;
- providing the wing, which comprises the connection spar receiving portion, the connection spar receiving portion comprising:
  - a first aperture; and
  - a second aperture located rearward of the first aperture of the connection spar receiving portion, with respect to a direction of flight of the aircraft;
- inserting, in the insertion direction, the connection spar of the wingtip device into the connection spar receiving portion of the wing; and
- inserting a retaining pin through each of the first and second apertures of the connection spar and the first and second apertures of the connection spar receiving portion to retain the connection spar in the connection spar receiving portion.

* * * * *